(12) United States Patent
Hisamatsu

(10) Patent No.: US 8,279,787 B2
(45) Date of Patent: Oct. 2, 2012

(54) PACKET PROCESSING APPARATUS

(75) Inventor: Hidenori Hisamatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 65 days.

(21) Appl. No.: 12/411,525

(22) Filed: Mar. 26, 2009

(65) Prior Publication Data

US 2009/0268629 A1 Oct. 29, 2009

(30) Foreign Application Priority Data

Apr. 23, 2008 (JP) ................................. 2008-111943

(51) Int. Cl.
G06F 1/32 (2006.01)
G11C 5/14 (2006.01)
(52) U.S. Cl. .................... 370/311; 713/320; 365/227
(58) Field of Classification Search .................. 370/310, 370/311; 365/226–229; 713/300–340, 375, 713/400, 500, 600
See application file for complete search history.

(56) References Cited

U.S. PATENT DOCUMENTS

| 5,637,932 | A   | * | 6/1997  | Koreeda et al. ............... 307/125 |
| 5,991,889 | A   | * | 11/1999 | Hikichi et al. ................. 713/501 |
| 6,513,124 | B1  | * | 1/2003  | Furuichi et al. ............... 713/322 |
| 6,647,502 | B1  | * | 11/2003 | Ohmori ......................... 713/322 |
| 6,728,271 | B1  | * | 4/2004  | Kawamura et al. ............ 370/536 |
| 6,807,235 | B2  | * | 10/2004 | Yano et al. ..................... 375/259 |
| 7,206,950 | B2  | * | 4/2007  | Tanaka et al. .................. 713/322 |
| 7,529,202 | B2  | * | 5/2009  | Oshima ........................ 370/311 |
| 2002/0073348 | A1 | * | 6/2002  | Tani .............................. 713/300 |
| 2002/0169990 | A1 | * | 11/2002 | Sherburne, Jr. ............... 713/300 |
| 2002/0175839 | A1 | * | 11/2002 | Frey .............................. 341/50 |
| 2003/0110406 | A1 | * | 6/2003  | Takada ......................... 713/320 |
| 2006/0080566 | A1 | * | 4/2006  | Sherburne, Jr. ............... 713/500 |

FOREIGN PATENT DOCUMENTS

| CN | 1340751 A    | 3/2002  |
| JP | 2003304224 A | 10/2003 |
| JP | 2004186848 A | 7/2004  |
| JP | 2004274099 A | 9/2004  |
| JP | 2005286749 A | 10/2005 |
| JP | 2006101029 A | 4/2006  |
| JP | 2006345278 A | 12/2006 |
| JP | 2008052487 A | 3/2008  |

OTHER PUBLICATIONS

Japanese Office Action for JP2008-11943 issued Dec. 20, 2011.
Chinese Office Action for CN200910132172.3 issued Feb. 13, 2012.

* cited by examiner

Primary Examiner — Michael Thier
Assistant Examiner — Prince A Mensah

(57) ABSTRACT

A packet processing apparatus includes a packet buffer unit that temporarily holds packet data, a packet processing unit that processes packet data output from the packet buffer unit, a clock supply unit that supplies a clock signal to the packet processing unit, and a control unit that detects a buffer vacant time indicating a time during which no packet data exists in the packet buffer unit based on an accumulation amount of the packet data in the packet buffer unit, and controls an operational state of the clock supply unit in accordance with the buffer vacant time.

3 Claims, 5 Drawing Sheets

US 8,279,787 B2

PACKET PROCESSING APPARATUS

INCORPORATION BY REFERENCE

This application is based upon and claims the benefit of priority from Japanese patent application No. 2008-111943, filed on Apr. 23, 2008, the disclosure of which is incorporated herein in its entirety by reference.

BACKGROUND OF THE INVENTION

1. Technical Field

The present invention relates to a packet processing apparatus, in particular a packet processing apparatus to process packet data at timing based on a clock signal.

2. Background Art

As energy conservation measures have been discussed around the World for the global environmental protection, legislation and enforcement of laws aimed at energy conservation and reduction of carbon dioxide emissions have also started to be discussed in various countries. In general, the energy conservation measures tend to be perceived as measures aimed at energy consumption involved in transportation, distribution, and manufacture. However, the increase in energy consumed by information communication devices and devices related to network infrastructure, as well as electronic devices such as computers and servers has been also getting attention in recent years. Therefore, it becomes necessary to take energy conservation measures in such technical fields.

Among these devices, with regard to the electronic devices such as computers and servers, they usually have relatively long time periods during which no operations are carried out (the so-called "standby state"). It is possible to reduce the average power consumption of such electronic devices by reducing power consumption while the electronic devices are in the standby state, and thereby to make a significant contribution to the reduction of carbon dioxide emissions calculated from the average power consumption. Meanwhile, with regard to the information communication devices, although they has been converted from analog communication devices to digital communication devices, they are still required to be constantly maintained in the state capable of carrying out data communications. Therefore, in the case of information communication devices, there is a prerequisite that, unlike the electronic devices such as computers and servers, the standby state is not feasible. That is, in the case of information communication devices, it is necessary to reduce electrical power in the normal operation state to reduce the average power consumption.

Therefore, only techniques taken from a viewpoint of device technology (for example, reduction in operating voltage resulting from higher integration and miniaturization of electronic components) are in the mainstream of techniques to achieve reduction in electrical power required in the information communication devices. However, the effect of reducing operating voltage resulting from the miniaturization of electronic components has reached such a level that the operating voltage is less than one volt. Since the reduction in operating voltage has shown a tendency to slow down, the effect by the higher integration has also shown a tendency to slow down. Therefore, it has become very difficult to reduce power consumption by a large amount. Furthermore, as the miniaturization has advanced to such a level that the width of wiring lines becomes less than 90 nm (nanometer), leak currents have become so large that they can no longer be ignored. Therefore, power consumption in the standby state has been increasing even though device vendors have been conducting their own research in device technology.

Meanwhile, energy conservation measures taken from a viewpoint of circuit designs have been also studied. For example, it might be a good idea to adopt an asynchronous circuit configuration and method without using a clock as a substitute for the clock-synchronous circuit configuration and method, which is in the mainstream of circuit configurations used within design electronic components. By adopting the asynchronous circuit configuration and method, it is possible to reduce the power consumption. This technique is aimed at achieving a reducing effect on the average power consumption by reducing power consumption in the normal operation and in the standby state. However, since development tools for the designing and the verification have not been upgraded sufficiently, developers of general electronic components such as ASICs (Application Specific Integrated Circuits) and FPGAs (Field Programmable Gate Arrays) have no opportunity to utilize the asynchronous circuit configuration and method.

Now, a configuration example of a packet processing function of a packet communication device in which an incoming traffic capacity varies is explained hereinafter with reference to FIG. 1. In this configuration, a packet is firstly input from a packet input terminal 111 to a packet buffer F-unit 112 in synchronization with a clock input from an input clock input terminal 131. The packet is accumulated at the buffer F-unit 112. Furthermore, the packet accumulated at the packet buffer F-unit 112 is output to a packet processing A-unit 113 where a first packet process A is to be carried out. The process A is carried out on the packet at the packet processing A-unit. Furthermore, the packet for which the process A is completed at the packet processing A-unit 113 is delivered via a clock transfer D-unit 114 to a packet processing B-unit 115 where a second packet process B is to be carried out. The process B is carried out on the packet in the packet processing B-unit 115. Furthermore, the packet for which the process B is completed at the packet processing B-unit 115 is delivered via a clock transfer E-unit 116 to a packet processing C-unit 117 where a third packet process C is to be carried out. The process C is carried out on the packet in the packet processing C-unit 117. Furthermore, the packet for which the process C is completed at the packet processing C-unit 117 is delivered to a packet buffer G-unit 118, and output from the packet output terminal 119 in synchronization with a clock input from an output clock input terminal 132. Furthermore, a clock distribution unit 140 generates clocks 1, 2, and 3 having appropriate frequencies required in the respective constitutional blocks from a reference clock input from a reference clock input terminal 134. The clock distribution unit 140 supplies the generated clocks to the respective constitutional blocks.

However, in the configuration described above, intervals between input packets become larger, so that the incoming traffic capacity is lowered. Furthermore, the clocks are constantly supplied from the clock distribution unit 140 even when no packet exists in the packet processing A-unit, the packet processing B-unit, and the packet processing C-unit and thereby no packet processing operations are required. Since the clocks are constantly supplied even when packet processing is not required in any of the packet processing units, each unit consumes electrical power in a constant manner. That is, it causes power consumption called "standby power consumption" in the above-described configuration. As a result, the average operating power consumption is never reduced by a large amount even when the traffic is low, and therefore it is impossible to achieve power savings.

To deal with this problem, Japanese Unexamined Patent Application No. 2006-345278 (hereinafter called "Patent document 1") and Japanese Unexamined Patent Application No. 2004-274099 (hereinafter called "Patent document 2") disclose techniques in which power consumption is reduced by suspending the supply of a clock signal. Specifically, in an image processing circuit in Patent document 1, the supply of an operating clock to flip-flops that are not required to operate is suspended based on the maximum value corresponding to a value for the brightest portion in the image data. Furthermore, in Patent document 2, in a case where a constantly-operating macro and an intermittently-operating macro are arranged in series, when it is detected that no packet is output from the constantly-operating macro at the preceding stage for a certain time period, the supply of the clock to the intermittently-operating macro at the subsequent stage is suspended.

However, the technique described above cannot operate properly when the number of stages of processing-units that operate with clock signals is large. For example, packet output to a certain processing-unit is monitored in the technique of Patent document 2. However, if some processing data remains in a processing-unit for which the supply of a clock is to be suspended, that data cannot be processed. As a result, it poses a problem that the throughput of the data processing is lowered.

An exemplary object of the present invention is to reduce the power consumption without the loss of the throughput in a packet communication device in which the incoming traffic capacity varies.

SUMMARY

An exemplary aspect of the present invention is a packet processing apparatus including: a packet buffer unit that temporarily holds packet data; a packet processing unit that processes packet data output from the packet buffer unit; a clock supply unit that supplies a clock signal to the packet processing unit; and a control unit that detects a buffer vacant time indicating a time during which no packet data exists in the packet buffer unit based on an accumulation amount of the packet data in the packet buffer unit, and controls an operational state of the clock supply unit in accordance with the buffer vacant time.

Furthermore, another exemplary aspect of the present invention is a computer program including: measuring a buffer vacant time indicating a time during which no packet data exists within a packet buffer unit based on an accumulation amount of the packet data in the packet buffer unit, the packet buffer unit being configured to temporarily store the packet data; and controlling an operational state of a clock supply unit in accordance with the buffer vacant time, the clock supply unit being configured to supply a clock signal defining the processing of a packet processing unit to the packet processing unit, the packet processing unit being configured to process the packet data output from the packet buffer unit.

Furthermore, another exemplary aspect of the present invention is a clock control method including: measuring a buffer vacant time indicating a time during which no packet data exists within a packet buffer unit based on an accumulation amount of the packet data in the packet buffer unit, the packet buffer unit being configured to temporarily store the packet data; and controlling an operational state of a clock supply unit in accordance with the buffer vacant time, the clock supply unit being configured to supply a clock signal to the packet processing unit, the packet processing unit being configured to process the packet data output from the packet buffer unit.

With a structure like these, the present invention has an excellent exemplary advantage that the supply operation of a clock signal is changed while suppressing decrease in the throughput of packet data so that the input packet data is continuously processed, and therefore the power consumption of the apparatus can be reduced.

EXEMPLARY EMBODIMENT

Figure 1:
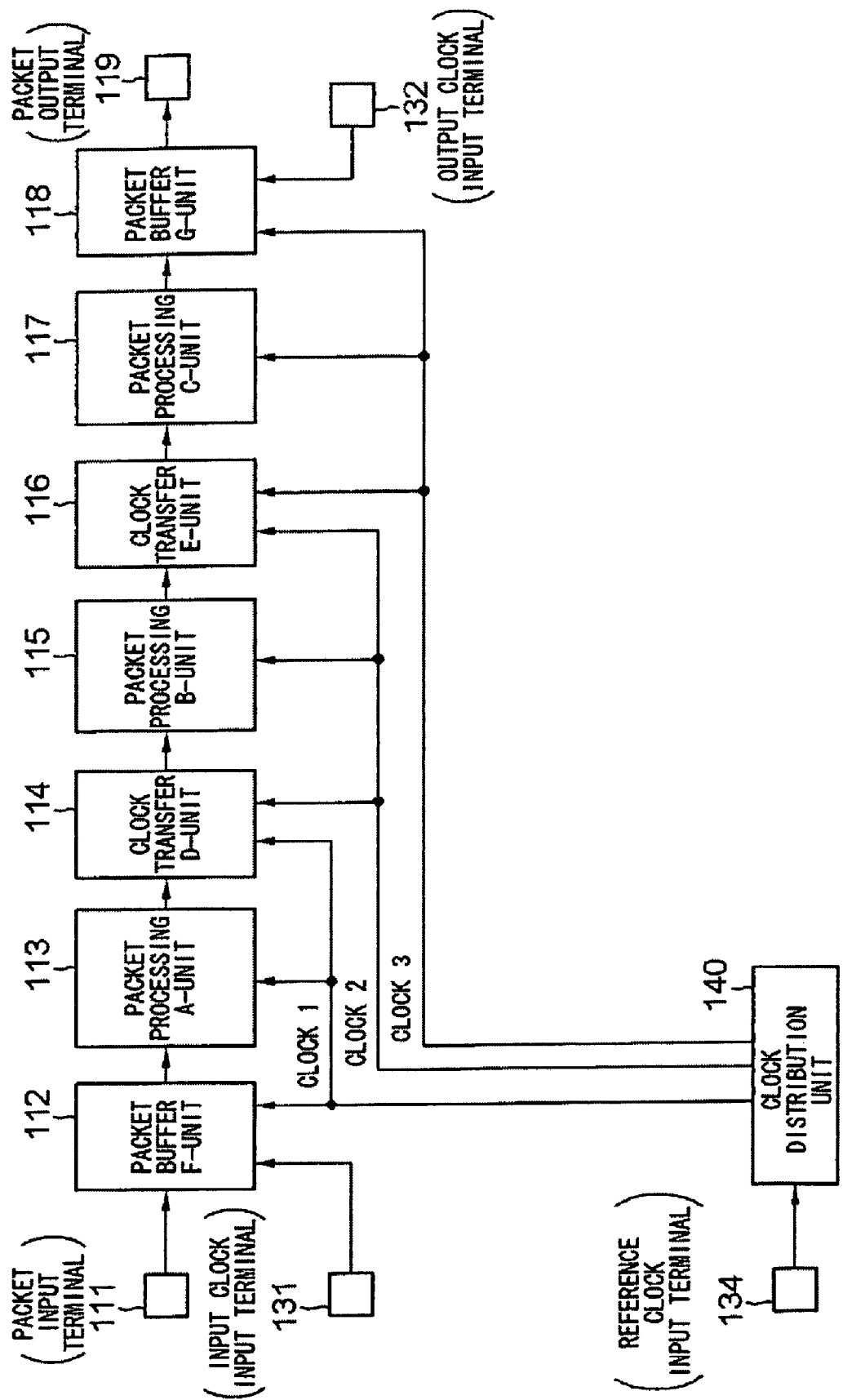
FIG. 1 is a functional block diagram illustrating one example of a packet communication device to which the present invention relates.

A exemplary aspect of a packet processing apparatus in accordance with an exemplary embodiment of the present invention is that a time during which the accumulation amount of incoming packet data is "0" is measured, and the supply operation of a clock signal for causing a packet processing unit to operate is changed based on the measured time.

Then, a packet processing apparatus in accordance with an example embodiment includes: a packet buffer unit that accepts and temporarily holds an input of packet data divided into predefined processing units; a packet processing unit that processes packet data output from the packet buffer unit; and a clock control unit that supplies a clock signal to the packet processing unit for causing the packet processing unit to operate. The packet processing apparatus further includes a buffer vacant time detection unit that detects the accumulation amount of packet data in the packet buffer unit and indicates a time during which no packet data exists in the packet buffer unit. Furthermore, the clock control unit controls the supply operation of the clock signal to the packet processing unit based on the buffer vacant time detected in the buffer vacant time detection unit.

The above-mentioned clock control unit controls the supply operation of the clock signal in such a manner that the supply operation of the clock signal to the packet processing unit is suspended, or that the frequency of the clock signal is set at a lower value and the clock signal is supplied to the packet processing unit.

According to the above-described packet processing apparatus, in a normal operation, packet data to be processed is firstly input to the packet buffer and accumulated in the packet buffer unit. Then, the packet data is output from the packet buffer unit to the packet processing unit in order. Then, the packet data is processed in the packet processing unit at operation timing based on the clock signal supplied to the packet processing unit. During the above-mentioned process, the accumulation amount of the packet data in the above-mentioned packet buffer unit is detected, and a time during which no packet data exists in the packet buffer unit is measured. Then, the supply operation of the clock signal to the above-mentioned packet processing unit is changed in accordance with the measured time during which no packet data exists. For example, the supply of the clock signal may be suspended, or the clock signal may continue to be supplied to the packet processing unit while the frequency of the clock signal is set at a lower value.

In this manner, the supply operation of the clock signal to the packet processing unit is changed in accordance with the input state of incoming packet data so that no influence is exerted on the data processing. Therefore, the supply of the clock signal is suspended while suppressing decrease in the throughput of packet data so that the input packet data is continuously processed, and therefore the power consumption of the apparatus can be reduced.

The above-mentioned clock control unit compares a buffer vacant time measured in the buffer vacant time detection unit with a comparison reference time that is determined in advance based on the number of packet processing units that process packet data, and controls the supply operation of the clock signal to the packet processing unit based on the comparison result. The above-mentioned comparison reference time is a time in which packet data is processed in all of the packet processing units, and the above-mentioned clock control unit suspends the supply of the clock signal to the packet processing unit if the buffer vacant time is larger than the comparison reference time. The above-mentioned buffer vacant time detection unit is configured to detect a situation where packet data is input to the packet buffer unit within which no packet exists until that moment. Furthermore, the above-mentioned clock control unit is configured, when the supply operation of the clock signal to the packet processing unit is being suspended, to start the supply operation of the clock signal to the packet processing unit when the above-mentioned buffer vacant time detection unit detects an input of packet data.

In this manner, in particular when the time during which packet data is not accumulated at all in the packet buffer unit exceeds the processing time by the packet processing unit, the supply of the clock signal to the packet processing unit is suspended. In such a case, since no packet data exists in any of the packet processing units, the supply of the clock signal can be suspended without causing any problem. Therefore, the power consumption can be reduced. Furthermore, when packet data is input to the packet buffer unit while the supply of the clock signal is being suspended, the supply of the clock signal is promptly resumed and the packet processing unit becomes ready to operate. Therefore, the input packet data can be processed, and decrease in the throughput can be suppressed.

Specific configurations and operations of packet processing apparatuses in accordance with exemplary embodiments of the present invention are explained hereinafter. Note that although exemplary embodiments in which packet processing apparatuses are illustrated as routers or switches are explained in the following explanation, packet processing apparatuses are not limited to those examples.

[First Exemplary Embodiment]

Figure 2:
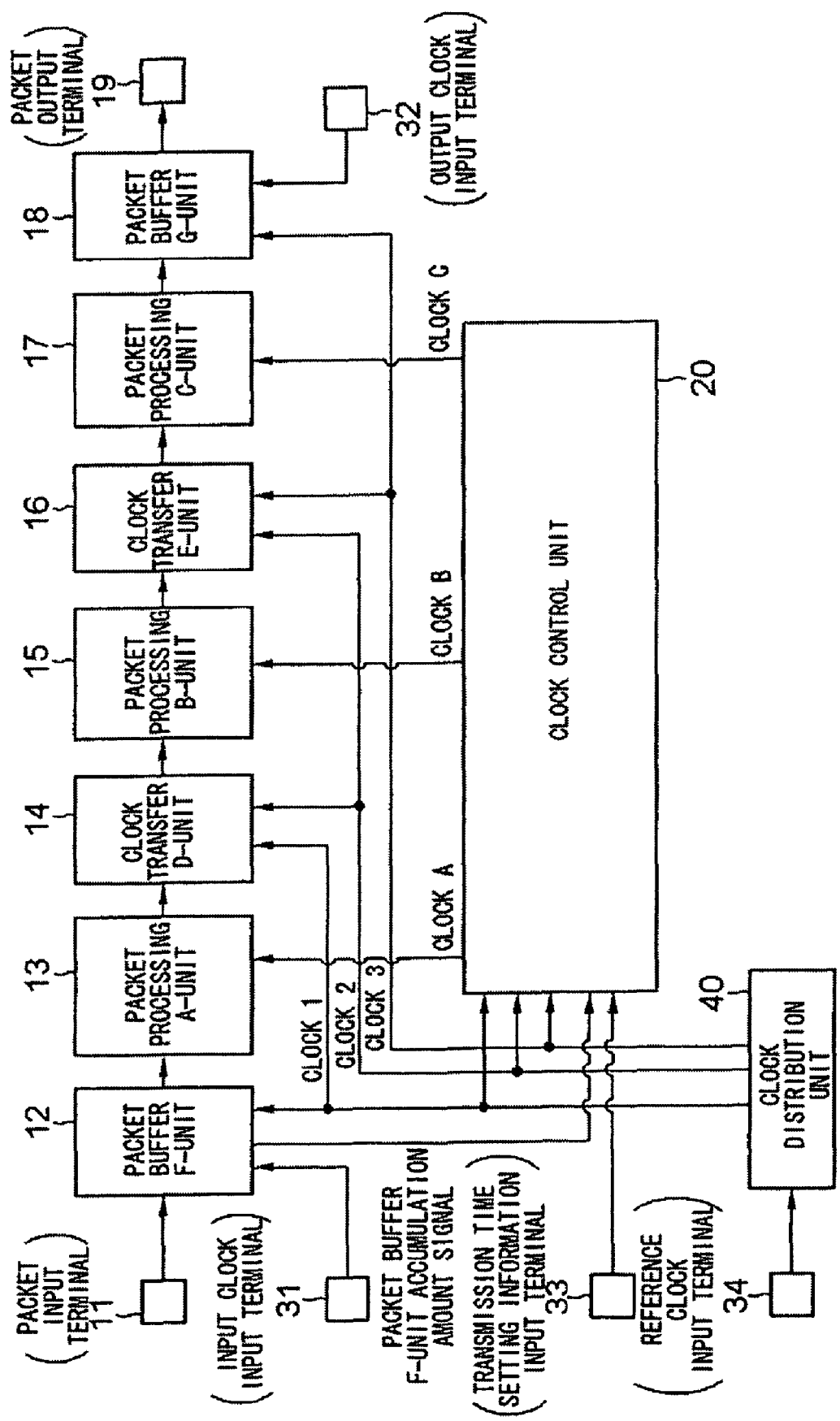
FIG. 2 is a functional block diagram illustrating one example of a packet communication device in accordance with a first exemplary embodiment of the present invention.
Figure 3:
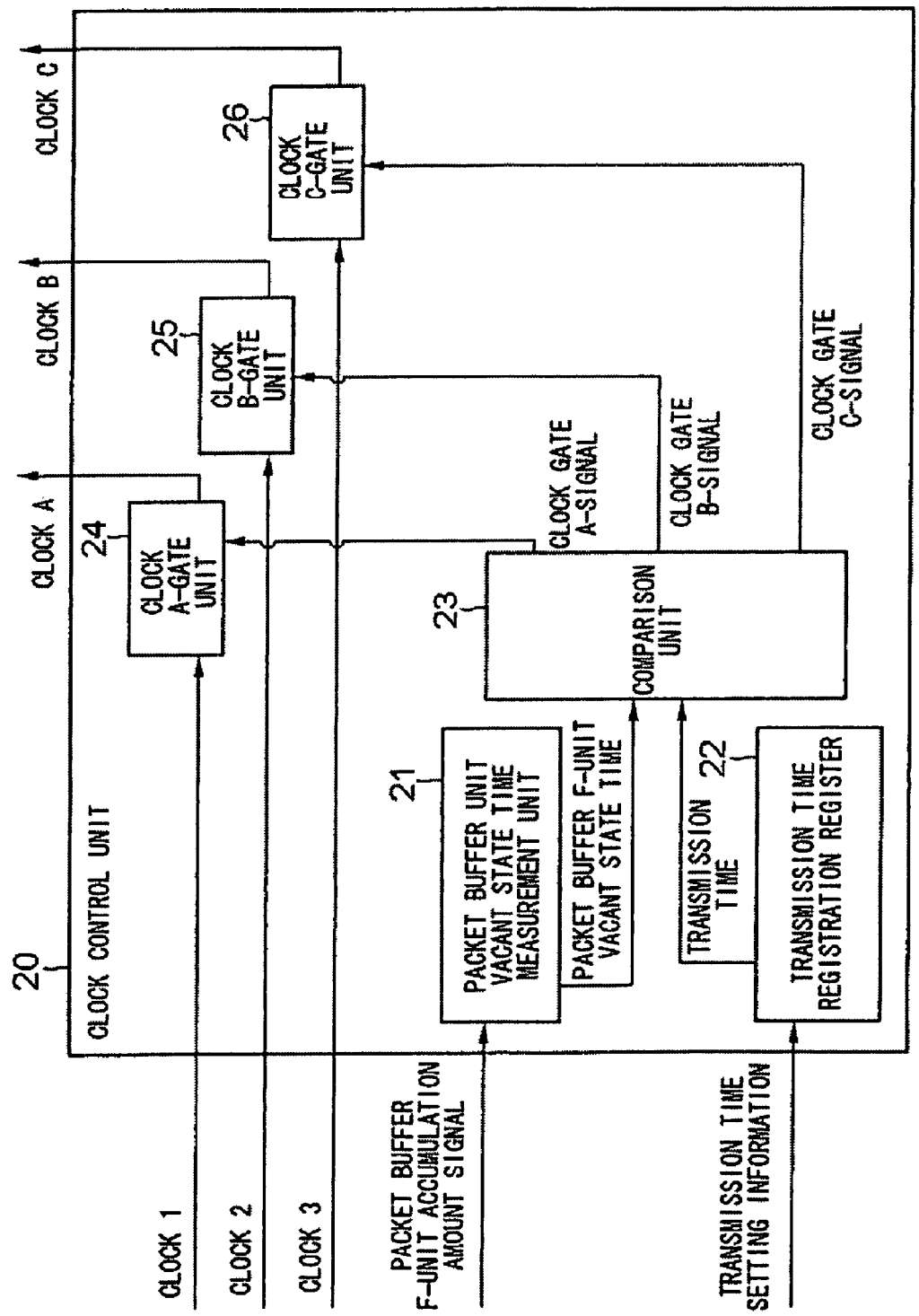
FIG. 3 is a functional block diagram illustrating a configuration of a clock control unit disclosed in FIG. 2.
Figure 4:
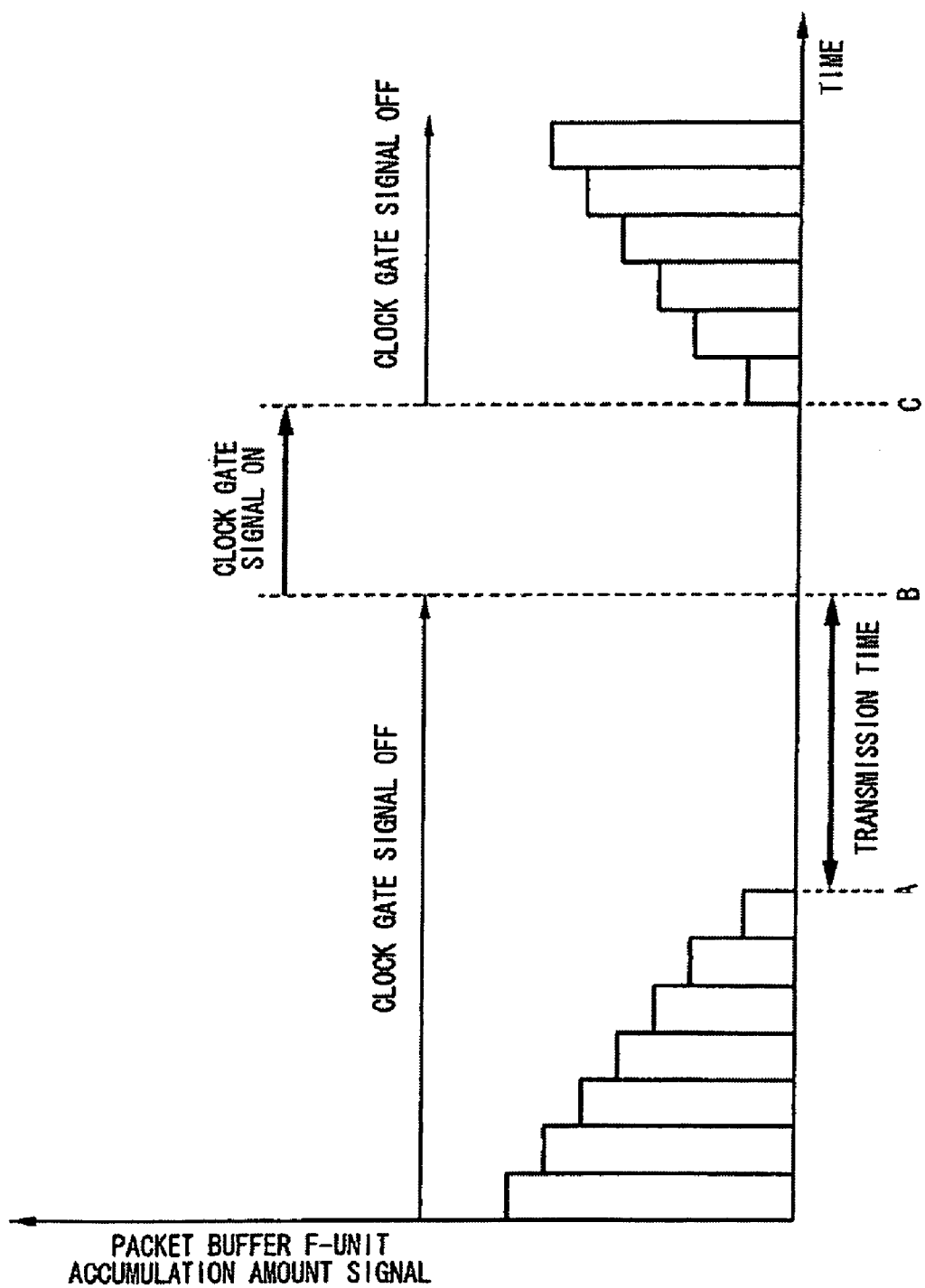
FIG. 4 is an explanatory diagram illustrating the relation between packet accumulation amounts and a clock supply operation in a packet communication device in accordance with an exemplary embodiment of the present invention.
Figure 5:
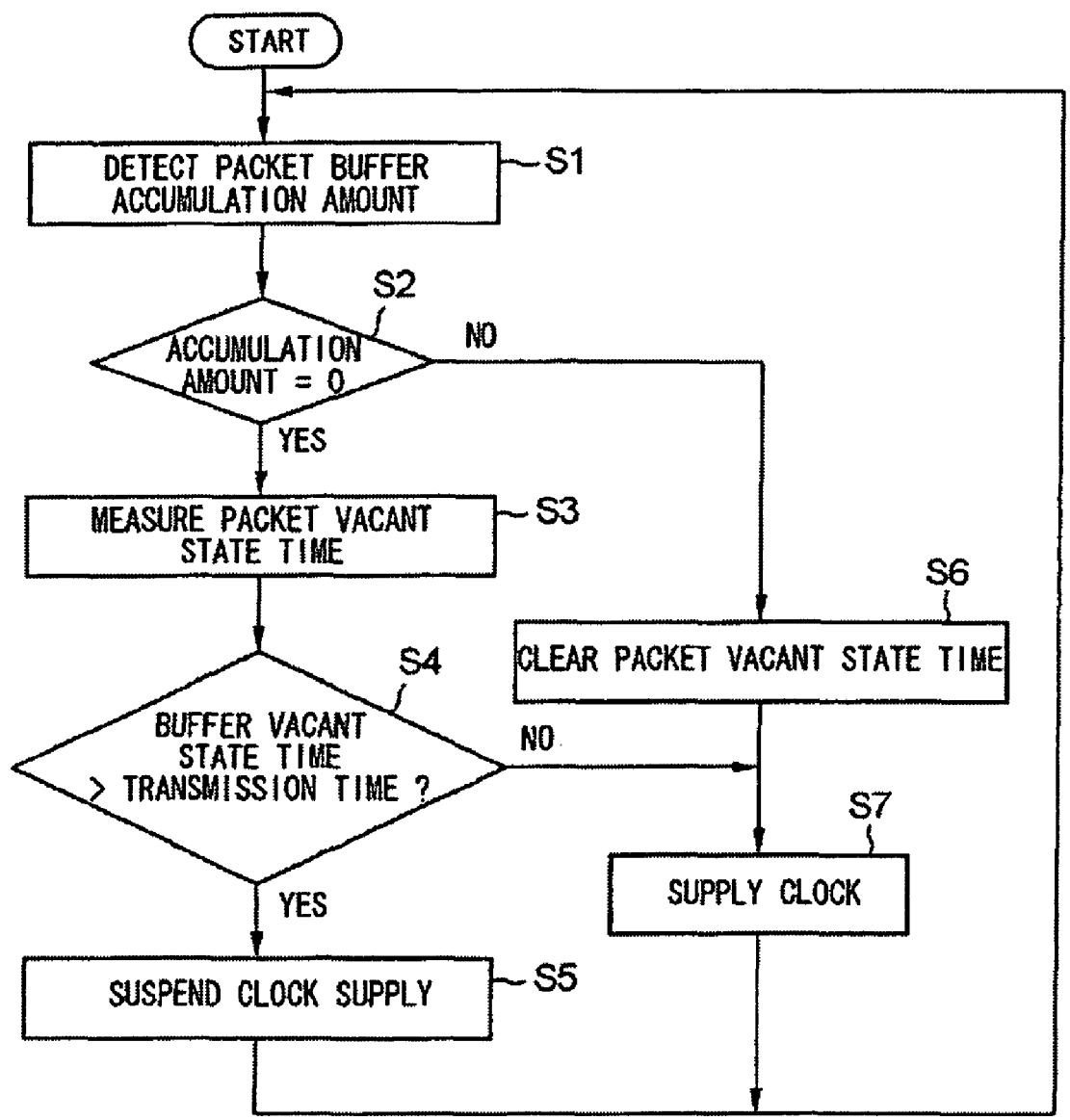
FIG. 5 is a flowchart illustrating an operation of a clock control unit disclosed in FIG. 2.

A first exemplary embodiment of the present invention is explained hereinafter with reference to FIGS. 2 to 5. FIG. 2 is a functional block diagram illustrating one example of a packet communication device, and FIG. 3 is a functional block diagram illustrating a configuration of a clock control unit. FIG. 4 is an explanatory diagram illustrating the relation between packet accumulation amounts and a clock supply operation. FIG. 5 is a flowchart illustrating an operation of the clock control unit.

[Configuration]

FIG. 2 shows a configuration of a router or a switch, which is one example of a packet communication device, and in particular, a configuration of the packet processing function of a packet communication device that performs packet processing. As shown in FIG. 2, a packet communication device such as a router and a switch includes a packet input terminal 11, a packet buffer F-unit 21, a packet processing A-unit 13, a clock transfer D-unit 14, a packet processing B-unit 15, a clock transfer E-unit 16, a packet processing C-unit 17, a packet buffer G-unit 16, a packet output terminal 19, a clock control unit 20, a clock distribution unit 40, an input clock input terminal 31, an output clock input terminal 32, a transmission time setting information input terminal 33, and a reference clock input terminal 34.

The packet communication device further includes a packet buffer F-unit 12 (packet buffer unit). The packet buffer F-unit 12 accepts an input of packet data divided into predefined data processing units (hereinafter called "packet") from a packet input terminal 11 in synchronization with a clock input from an input clock input terminal 31, and temporarily accumulates it. The packet buffer F-unit 12 sends an accumulation amount signal to the clock control unit 20 at regular time intervals or whenever an input of a packet is accepted. The accumulation amount signal indicates a packet accumulation amount within the packet buffer F-unit 21.

Note that the maximum accumulation amount of the packet buffer F-unit 12 is equal to or larger than a packet amount corresponding to a time required to transmit a packet through a path formed by the packet processing A-unit 13 to the packet processing C-unit 17. In other words, the maximum packet accumulation amount is the maximum number of packets that can be output by the packet buffer F-unit 12 while a time in which one packet output from the packet buffer F-unit 12 is processed in a series of the processing-units (including packet processing units 13, 15, and 17, and clock transfer units 14 and 16) elapses. Note that the series of processing units are formed from a plurality of processing-units that are located at subsequent stages to the packet buffer F-unit 12 and are to process that packet. However, the maximum accumulation amount of the packet buffer F-unit is not limited to the above-mentioned amount.

The packet buffer F-unit 12 outputs the accumulated packet to the packet processing A-unit 13 based on a clock supplied from the clock distribution unit 40. The packet processing A-unit 13 performs a first packet process A on the input packet in synchronization with a clock A supplied from the clock control unit 20. The packet processing A-unit 13 outputs the packet on which the process A is completed to the clock transfer D-unit 14. In this manner, the packet on which the process A is completed is output to the packet processing B-unit 15 via the clock transfer D-unit 14.

The packet processing B-unit 15 performs a second packet process B on the input packet in synchronization with a clock B supplied from the clock control unit 20. The packet processing B-unit 15 outputs the packet on which the process B is completed to the clock transfer E-unit 16. The packet on which the process B is completed is output to the packet processing C-unit 17 via the clock transfer E-unit 16.

The packet processing C-unit 17 performs a third packet process C on the input packet in synchronization with a clock C supplied from the clock control unit 20. Then, the packet on which the process C is completed in the packet processing C-unit 17 is output to a packet buffer G-unit 18, and the packet buffer G-unit 18 outputs the packet from the packet output terminal 19 in synchronization with a clock input from the output clock input terminal 32.

Furthermore, the clock distribution unit 40 generates clocks 1, 2, and 3 having appropriate frequencies for the respective blocks (such as the clock control unit 20) from a reference clock input from the reference clock input terminal 34. The clock distribution unit 40 supplies the generated clocks to the respective blocks. Specifically, as illustrated in FIG. 2, the clock distribution unit 40 supplies the clock 1 to the packet buffer F-unit 12, the clock transfer D-unit 14, and the clock control unit 20. The clock distribution unit 40 supplies the clock 2 to the clock transfer D-unit 14, the clock transfer E-unit 16, and the clock control unit 20. The clock distribution unit 40 supplies the clock 3 to the clock transfer E-unit 16, the packet buffer G-unit 18, and the clock control unit 20.

Although the clock frequencies are defined as three clocks, i.e., the clock 1, 2, and 3 for simplifying the explanation, a plurality of clock frequencies may be supplied to each constitutional block. Note that the clock distribution unit 40 supplies three clocks, i.e., the clock 1, 2, and 3 to the clock control unit 20. As explained later, the clock control unit 20 supplies a clock A, B, and C to the packet processing A-unit 13, the packet processing B-unit 15, and the packet processing C-unit 17, respectively, based on the respective input clocks.

Next, the detailed configuration of the clock control unit 20 disclosed in FIG. 2 is explained hereinafter with reference to FIG. 3.

As shown in FIG. 3, the clock control unit 20 includes a packet buffer F-unit vacant state time measurement unit 21, a transmission time registration register 22, and a comparison unit 23. Note that the function of the clock control unit 20 can be realized by incorporating a certain computer program into an arithmetic unit constituting the clock control unit. That is, the blocks 21 to 23 are constructed by incorporating a certain computer program(s).

As shown in FIG. 3, the clock control unit 20 further includes a clock A-gate-unit 24, a clock B-gate-unit 25, and a clock C-gate-unit 26. The gate-unit 24 outputs a clock A based on an input of the clock 1. The other gate units 25 and 26 operate in a similar manner.

The operational state of the gate-unit 24 is determined based on a gate A-signal output from the comparison unit 23. When the gate A-signal indicates "gate ON", the gate-unit 24 enters a state where it does not output the clock A in accordance with the clock 1. When the gate A-signal indicates "gate OFF", the gate-unit 24 enters a state where it outputs the clock A in accordance with the clock 1. The other gate units 25 and 26 operate in a similar manner.

As obvious from the above explanation, the gate-unit 24 forms a clock supply unit that supplies the clock A to the packet processing A-unit 13. The other gate units 25 and 26 operate in a similar manner. It is also possible to consider all of the gate units 24 to 26 as the clock supply unit. Note that the gate units 24 to 26 may also be recognized as switches for supplying or not supplying the corresponding clocks.

As shown in FIG. 3, the packet buffer F-unit vacant state time measurement unit 21 (hereinafter sometimes called as "buffer vacant time measurement unit" or "buffer vacant time detection unit") accepts a packet buffer F-unit accumulation amount signal (hereinafter called "accumulation amount signal") sent from the packet buffer F-unit 12. The buffer vacant time measurement unit 21 measures a time during which no packet is accumulated (there is no accumulated packet) in the packet buffer F-unit based on the accepted accumulation amount signal. In other words, the buffer vacant time measurement unit 21 simply detects the certain period of time in which no packet is accumulated in the packet buffer F-unit. The buffer vacant time measurement unit 21 performs this measurement at regular intervals or whenever the above-mentioned accumulation amount signal is received. The buffer vacant time measurement unit 21 delivers the measured packet buffer F-unit vacant state time to the comparison unit 23. For example, The buffer vacant time measurement unit 21 measures a time (horizontal axis) during which the packet buffer F-unit accumulation amount (vertical axis) remains at "0", as shown between the time "a" and the times "b" and "c". When a situation where at least one packet is input to the packet buffer F-unit 12 in the state where the packet buffer F-unit accumulation amount is "0" (there is no accumulated packet) is detected, the buffer vacant time measurement unit 21 notifies the comparison unit 23 that the packet buffer F-unit vacant state time is "0". This is because since the packet buffer accumulation amount is no longer "0", packet buffer F-unit vacant state time cannot be measured.

The transmission time registration register 22 receives transmission time setting information (comparison reference time) input from the transmission time setting information input terminal 33, and stores as a transmission time. The transmission time registration register 22 outputs the stored transmission time information to the comparison unit 23. Note that in this exemplary embodiment of the present invention, the above-mentioned transmission time setting information corresponds to a time required to complete the process of one packet accumulated in and output from the above-mentioned packet buffer F-unit 12 by transmitting it through the packet processing A-unit 13 to the packet processing C-unit 17. That is, the transmission time setting information indicates a time in which one packet output from the packet buffer F-unit 12 is processed in all the processing-units that are located at subsequent stages to the packet buffer F-unit 12 and are to process that packet (including packet processing units 13, 15, and 17, and clock transfer units 14 and 16).

The above-mentioned comparison unit 23 compares a packet buffer F-unit vacant state time output from the buffer vacant time measurement unit 21 with a transmission time output from the transmission time registration register 22. Note that this comparison may be carried out whenever a measurement result is notified from The buffer vacant time measurement unit 21, or at regular time intervals. When the comparison result of the comparison unit 23 indicates that the packet buffer F-unit vacant state time has become larger than the transmission time as shown in the period at or later than the time "b" in FIG. 4, the comparison unit 23 operates in the following manner. That is, the comparison unit 23 outputs a clock gate A-signal, a clock gate B-signal, and a clock gate C-signal all of which are in "gate ON" states to the clock A-gate-unit 24, the clock B-gate-unit 25, and the clock C-gate-unit 26 respectively. The "gate ON" signals are control signals used to control the respective gate units 24, 25, and 26 such that they suspend the output of clocks. Therefore, the gate units 24, 25, and 26 that received the "gate ON" signals suspend the clock outputs to their respective packet processing units 13, 15, and 17.

Furthermore, the comparison unit 23 outputs the clock gate A-signal, the clock gate B-signal, and the clock gate C-signal all of which are in "gate OFF" states except when the above-mentioned comparison result indicates that the packet buffer F-unit vacant state time is larger than the transmission time. The "gate OFF" signals are control signals used to control the respective gate units 24, 25, and 26 such that they output the clocks.

Therefore, the comparison unit 23 (clock control unit 20) constantly supplies the clock signals to the packet processing units 13, 15, and 17 in the period at or earlier than the time "b" (even when the accumulation amount is "0", its duration, i.e., the packet buffer F-unit vacant state time (buffer vacant time) has not exceeded the transmission time), or in the period at or later than the time "c" (when the packet buffer F-unit accumulation amount is not "0") in FIG. 4. When the accumulation amount is "0" and its duration, i.e., the packet buffer F-unit vacant state time has exceeded the transmission time, the comparison unit 23 suspends the supply of the clock signals during that period. In this way, the clock supply operation by the clock control unit 20 is changed. When a packet is input to the packet buffer F-unit 12 and thus the accumulation amount becomes no longer "0" (when the packet buffer F-unit vacant state time becomes "0"), the comparison unit 23 starts supplying the clock signals to the packet processing units 13, 15, and 17. In this manner, the clock supply operation by the clock control unit 20 is changed from the state where the clock signals are not supplied to the state where the clock signals are supplied.

Note that an example in which when the packet buffer F-unit vacant state time during which the packet buffer F-unit accumulation amount is "0" exceeds the transmission time in the comparison unit 23, the clock supply to the respective packet processing units 13, 15, and 17 is suspended has been illustrated. However, the timing at which the supply to the packet processing units 13, 15, and 17 is suspended is not limited to the timing described above. Furthermore, the transmission time with which the packet buffer F-unit vacant state time is compared is not necessarily limited to the value described above. For example, the clock supply operation may be changed in such a manner that the clock supply is suspended in accordance with other decision criteria based on the above-mentioned packet buffer F-unit vacant state time.

[Operation]

Next, an operation of the above described packet communication apparatus, in particular, an operation of the clock control unit 20 is explained hereinafter with reference to FIG. 4 and a flowchart shown in FIG. 5.

Firstly, the clock control unit 20 accepts an accumulation amount signal sent from the packet buffer F-unit 12 in the buffer vacant time measurement unit 21 (Step S1). Then, when an incoming packet(s) is accumulated within the packet buffer F-unit 12 ("No" at Step S2, at or before time "a" in FIG. 4), the buffer vacant time measurement unit 21 clears the packet buffer vacant state time (sets to "0") (Step S6), and remains in the state where the clocks are being supplied to the packet processing units 13, 15, and 17 (Step S7). That is, since the packet buffer vacant state time is "0", the comparison unit 23 continues to output "gate OFF" signals to the respective gate units 24, 25, and 26, these respective clock gate units 24, 25, and 26 continue to supply the clock signals to the respective packet processing units 13, 15, and 17, and the packet(s) accumulated in the packet buffer F-unit 12 is processed in the packet processing units and the like.

After that, when the buffer vacant time measurement unit 21 detects that the accumulation amount signal from the packet buffer F-unit 12 is "0", that is, no packet is accumulated (Step S1, "Yes" at Step S2, at or after time "a" in FIG. 4), a packet buffer vacant state time during which the packet accumulation amount is "0" is measured (Step S3, Buffer vacant time measuring step). Then, the measured packet buffer vacant state time is compared with a transmission time registered in the transmission time registration register in the comparison unit 23 (Step S4). At this point, if the packet buffer vacant state time has not exceeded the transmission time ("No" at Step S4, before time "b" in FIG. 4), the comparison unit 23 continues to output "gate OFF" signals to the respective clock gate units 24, 25, and 26. In this way, the clock signals continue to be supplied from these clock gate units 24, 25, and 26 to the respective packet processing units 13, 15, and 17 (Step S7), and the packet(s) accumulated in the packet buffer F-unit 12 is processed in the packet processing units and the like.

After that, the above described process is repeated whenever an accumulation amount signal is received from the packet buffer F-unit 12. Then, when the state where the accumulation amount time is "0" has continued for a certain time period, it is detected by the comparison in the comparison unit 23 that the packet buffer F-unit vacant state time measured in the buffer vacant time measurement unit 21 has exceeded the transmission time ("Yes" at Step S4, time "b" in FIG. 4). Then, the comparison unit 23 outputs "gate ON" signals to the respective clock gate units 24, 25, and 26. In this way, the supply of the clock signals from these clock gate units 24, 25, and 26 to the respective packet processing units 13, 15, and 17 is suspended (Step S5, Clock supply operation changing step). Then, as described above, the suspension of the above-mentioned clock signal supply is continued as long as the packet buffer F-unit vacant state time measured in the buffer vacant time measurement unit 21 is larger than the transmission time (from time "b" to time "c" in FIG. 4).

After that, when packet data is input to the packet buffer F-unit 12 and thus the buffer vacant time measurement unit 21 detects that the accumulation amount signal from the packet buffer F-unit 12 is changed from "0" to a value other than "0", i.e., a packet(s) is accumulated again (Step S1, "No" at Step S2, Buffer vacant time measuring step, at or after time "c" in FIG. 4), the buffer vacant state time is cleared (set to "0") (Step S6) and the clock supply to the packet processing units 13, 15, and 17 is resumed (Step S7, Clock supply operation changing step). That is, since the buffer vacant state time becomes "0", the comparison unit 23 outputs "gate OFF" signals to the respective gate units 24, 25, and 26. In this way, these gate units 24, 25, and 26 enter a state where they continuously supply the clock signals to the respective packet processing units 13, 15, and 17. Then, the packet(s) accumulated in the packet buffer F-unit 12 is processed in the packet processing units and the like.

As has been described above, in accordance with this exemplary embodiment of the present invention, a time during which no packet data exists within the packet buffer F-unit 12 is measured, and the supply operation of the clock signals to the packet processing units 13, 15, and 17 is changed in accordance with the measured time during which no packet data exists. For example, when a time during which no packet data is accumulated exceeds the time required for a series of processes for one packet, i.e., the transmission time, the supply of the clock signals is suspended. In this way, the supply of a clock signal to a packet processing unit is suspended only when no packet to be processed is accumulated. Therefore, the power consumption can be reduced without causing any influence to the throughput. Meanwhile, when packet data is accumulated in the packet buffer F-unit 12, the supply of the clock signal is resumed. Therefore, the process on that packet data can be promptly resumed, and decrease in the throughput can be suppressed.

Note that an example in which when a state where no packet exists in the packet buffer F-unit 12 exceeds a determined time (transmission time), the supply of a clock signal to the packet processing unit and the like is suspended is illustrated in the above description. In this case, the clock control unit 20 may set the frequency of the supplied clock at lower value and supply the clock signal having the lowered frequency to the packet processing unit and the like, instead of completely stopping the supply of the clock signal. Even with such a configuration, the power consumption involved in the clock supply operation can be reduced when there is no packet to be processed in the packet buffer F-unit 12.

Furthermore, although a case of three packet processing units and two clock transfer units are shown as one example of the packet processing unit that is located at a subsequent stage to the packet buffer F-unit 12 and is to process packet data as shown in FIG. 2 in the above description, it is not limited to that configuration. N packet processing units and (N−1) clock transfer units (N=1, 2, 3, . . . ) may be arranged in subsequent stages to the packet buffer F-unit 12. Furthermore, any other number of packet processing units may be arranged.

The packet processing apparatus in accordance with an exemplary embodiment of the present invention can be applied to packet processing apparatuses in which an input of packet data is put in a standby state (such as routers and switches).

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A packet processing apparatus comprising:
a packet buffer unit that temporarily holds packet data, the packet buffer unit outputting an accumulation amount signal indicating an amount of packet data accumulated in the packet buffer unit;
a packet processing unit that processes packet data output from the packet buffer unit;
a clock supply unit that supplies a clock signal to the packet processing unit;
a buffer vacant measurement unit that receives the accumulation amount signal supplied from the packet buffer unit, and measures a buffer vacant time indicating a duration in which the accumulated amount is zero based on the accumulation amount signal supplied from the packet buffer unit; and,
a comparison unit that compares the buffer vacant time with a predetermined comparison reference time and controls an operational state of the clock supply unit based on the comparison results, such that the supply operation of the clock signal is suspended or the clock signal having a frequency less than a threshold frequency being supplied to the packet processing unit during a period in which the buffer vacant time exceeds the predetermined comparison reference time,
wherein the predetermined comparison reference time is a time required to process the packet data in the packet processing unit,
and wherein the comparison unit controls the operational state of the clock supply unit such that the supply of the clock signal is suspended when the buffer vacant time is longer than the comparison reference time.

2. A packet processing apparatus comprising:
a packet buffer unit that temporarily holds packet data, the packet buffer unit outputting an accumulation amount signal indicating an amount of packet data accumulated in the packet buffer unit;
a packet processing unit that processes packet data output from the packet buffer unit;
a clock supply unit that supplies a clock signal to the packet processing unit;
a buffer vacant measurement unit that receives the accumulation amount signal supplied from the packet buffer unit, and measures a buffer vacant time indicating a duration in which the accumulated amount is zero based on the accumulation amount signal supplied from the packet buffer unit; and,
a comparison unit that compares the buffer vacant time with a predetermined comparison reference time and controls an operational state of the clock supply unit based on the comparison results, such that the supply operation of the clock signal is suspended or the clock signal having a frequency less than a threshold frequency being supplied to the packet processing unit during a period in which the buffer vacant time exceeds the predetermined comparison reference time,
wherein the comparison unit controls the clock supply unit such that the supply operation of the clock signal is suspended when a state where the packet data exists in the packet buffer unit is changed to a state where no packet data exists in the packet buffer unit.

3. The packet processing apparatus according to claim 2, wherein the control unit controls the clock supply unit such that the supply operation of the clock signal is started when a state where no packet data exists in the packet buffer unit is changed to a state where the packet data exists in the packet buffer unit.

* * * * *